July 14, 1970  C. E. BRONN ET AL  3,520,501
AERIAL DELIVERY APPARATUS FOR AIRCRAFT
Filed Oct. 4, 1968  4 Sheets-Sheet 2
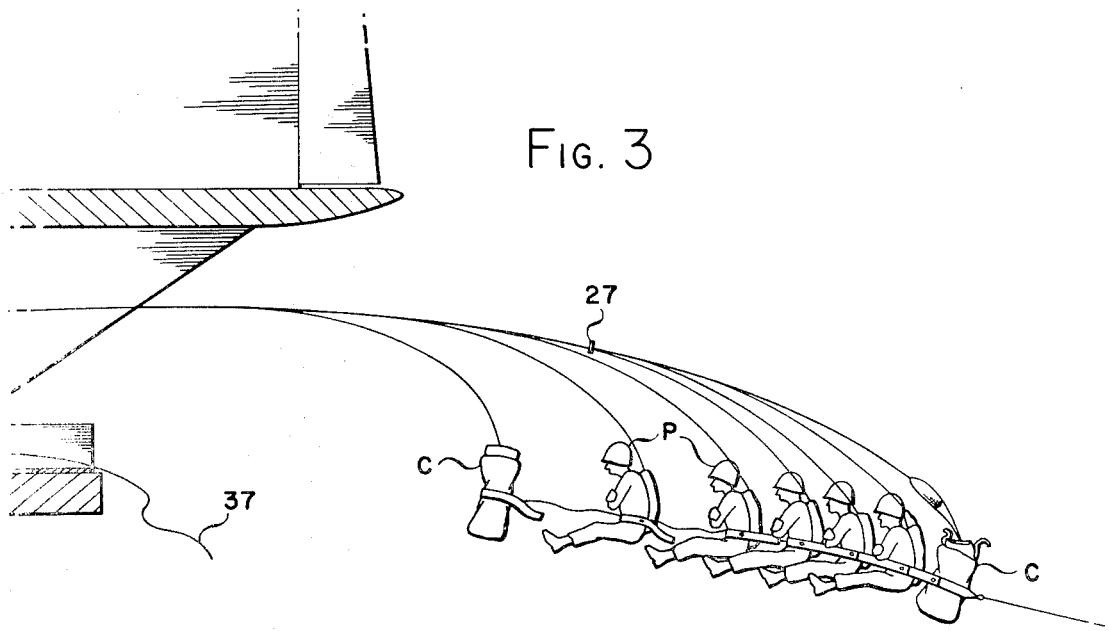
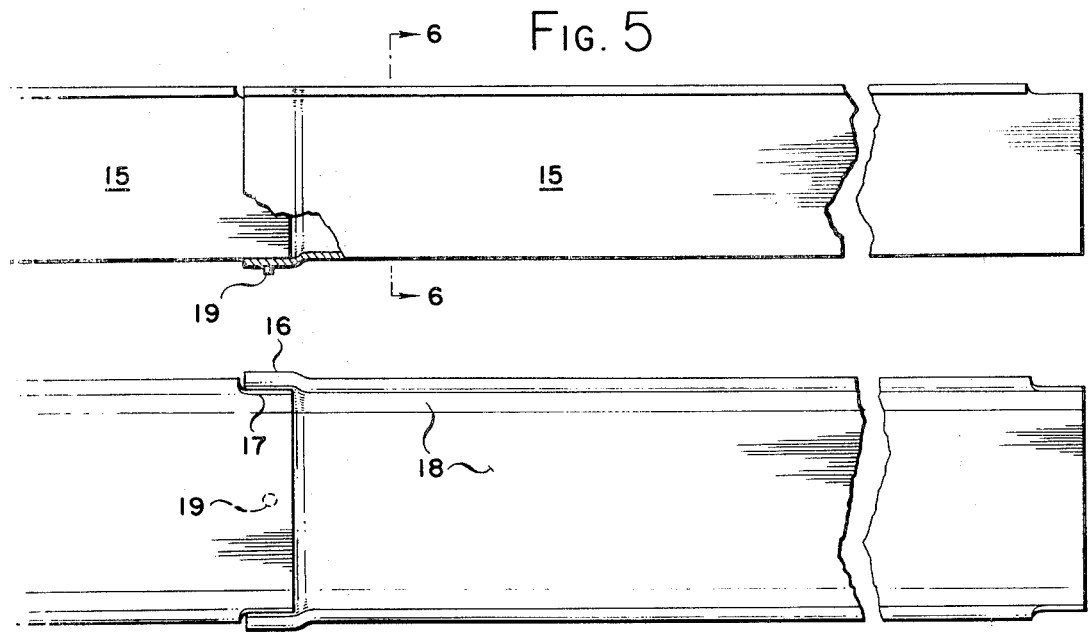
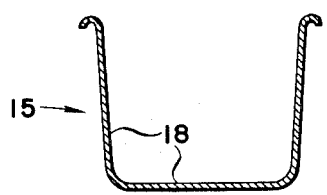
INVENTORS.
CARL E. BRONN
CHARLES N. CROW
CHARLES W. MILLER
BY *George C. Sullivan*
Agent
*John J. Sullivan*
Attorney July 14, 1970   C. E. BRONN ET AL   3,520,501
AERIAL DELIVERY APPARATUS FOR AIRCRAFT
Filed Oct. 4, 1968   4 Sheets-Sheet 3

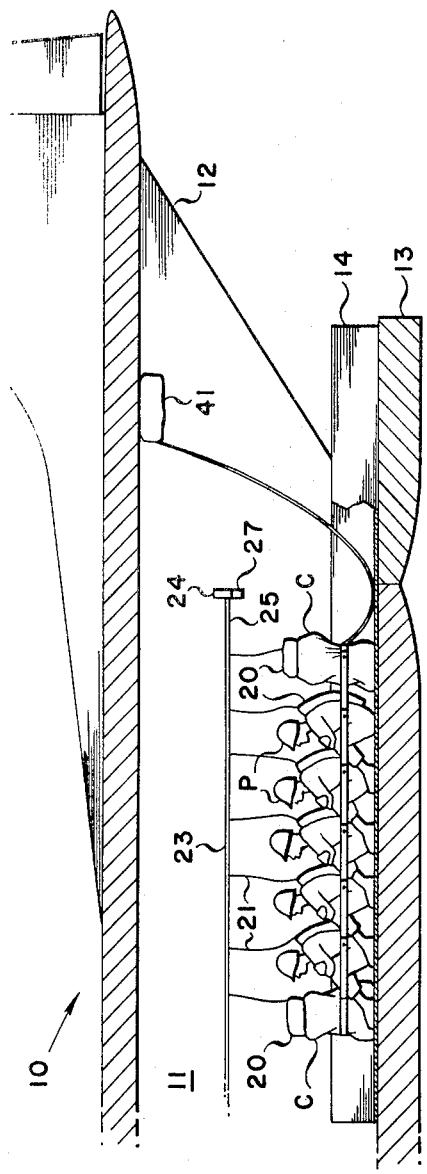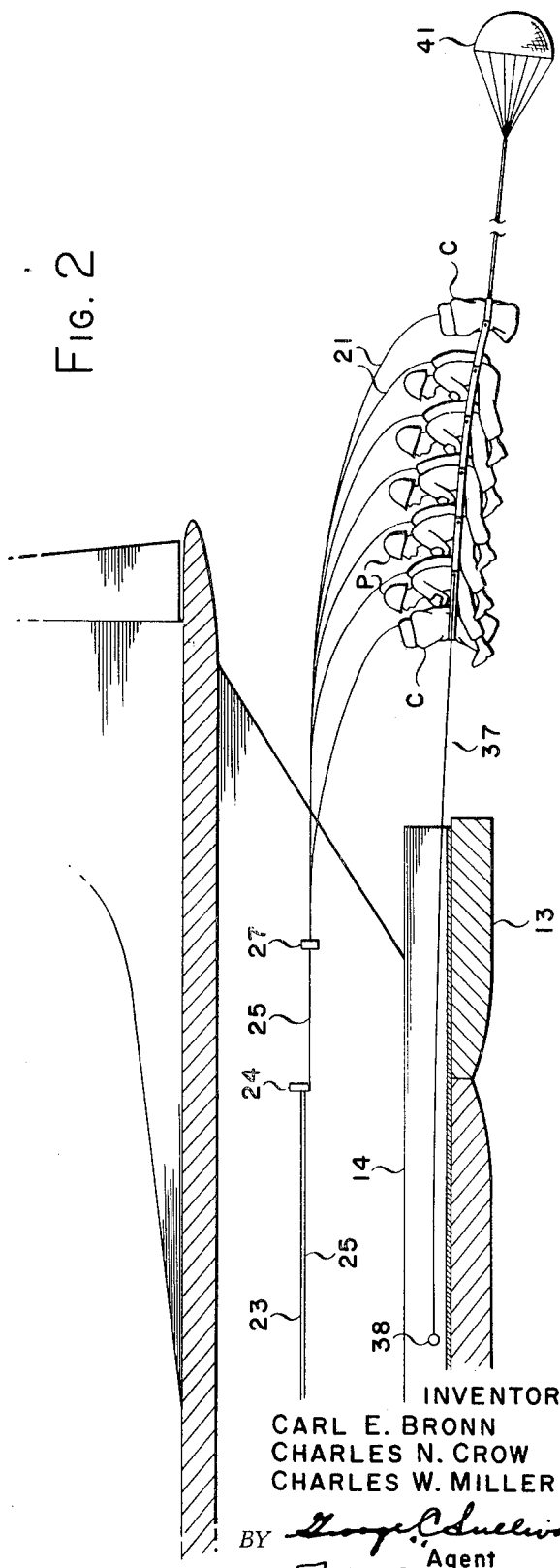
INVENTORS.
CARL E. BRONN
CHARLES N. CROW
CHARLES W. MILLER

INVENTORS.
CARL E. BRONN
CHARLES N. CROW
CHARLES W. MILLER

BY *George Sullivan*
Agent

*John J. Sullivan*
Attorney

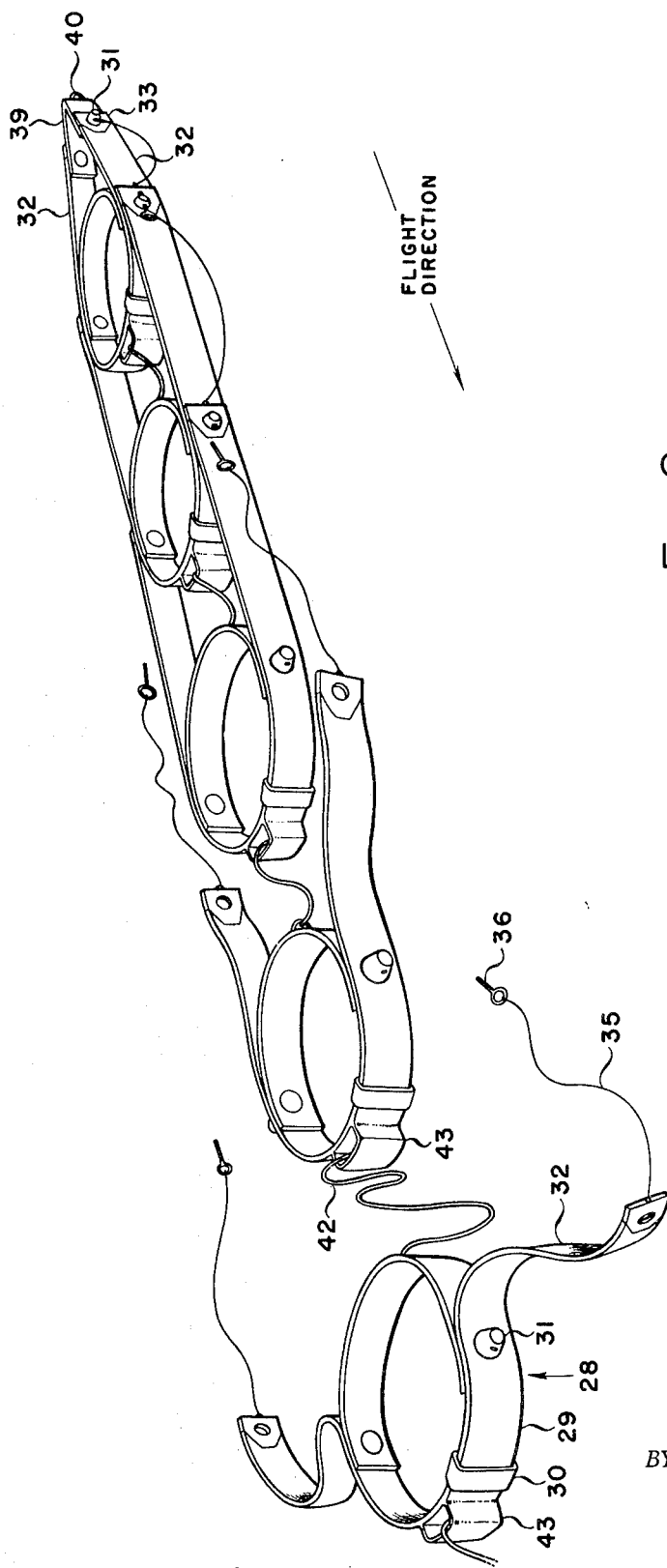

United States Patent Office 3,520,501
Patented July 14, 1970

3,520,501
AERIAL DELIVERY APPARATUS FOR AIRCRAFT
Carl E. Brown, Atlanta, and Charles N. Crow and Charles W. Miller, Marietta, Ga., assignors to Lockheed Aircraft Corporation, Burbank, Calif.
Filed Oct. 4, 1968, Ser. No. 765,129
Int. Cl. B64d 9/00
U.S. Cl. 244—137
10 Claims

ABSTRACT OF THE DISCLOSURE

An aerial delivery system is provided to airdrop multiple objects, either pieces of cargo or paratroopers or a combination of both, quickly and within a predetermined, limited surface target area. Means is included to join the several troopers or cargo pieces in a "stick" for extraction as a unit from the aircraft and subsequent separation one from another to allow individual freedom of movement thereof to some predetermined degree. Knock-down structure within the aircraft hold is provided to facilitate movement of each "stick" therefrom into the airstream to permit rapid reconversion of the aircraft to conventional transport or cargo condition.

---

This invention relates to aerial delivery techniques for objects, which may be either animate or inanimate, from aircraft having particular interest in the rapid and reliable delivery of multiple such objects from the aircraft during flight onto a relatively small, selected ground or surface area by optimizing the spacing of the discrete objects both with respect to time and distance and maintaining a safe, minimum space therebetween at all times during the total operation.

While the present invention has general application in aerial deliveries or "airdrops" as they are commonly called, it has particular utility in military operations where supplies and/or personnel are required in remote, undeveloped, and generally inaccessible geographical areas. In the case of supplies, it is desirable that the delivery be made with relatively small bundles to minimize damage and breakage and avoid the requirement for elaborate cushioning or impact resistance apparatus. Problems are thereby created in controlling the disbursement of the supplies and maintaining a minimum size, preselected target area. The same is generally true of personnel or paratroopers so that they can assemble quickly and act as a team in the tactical operations for which they are placed there. In any case, these problems are easier to handle where rapid ejection or drop of the several bundles and/or individuals can be effected and at the lowest possible altitude.

Using state-of-the-art techniques where personnel or paratroopers, for example, are employed in the airdrop, they are required to drop one at a time in rapid succession, but at spaced intervals to assure against entanglement or collision during descent. Their several parachutes are opened by individual static lines connected to the aircraft, and for safety reasons each paratrooper is required to wear an extra or reserve parachute for use in the event the main parachute fails.

The lowest, safe altitude for paratrooper jumps is, and has been established to be, the time required for each jumper to determine first that his primary chute has not opened and then to release his secondary chute and have it fully deployed. The lowest possible altitude in the case of paratroopers is, of course, even more important than with inanimate objects because of the vulnerability to enemy fire of the trooper during descent.

The present invention is, therefore, directed to the above and proposes to overcome shortcomings in airdrop operations as it exists up to now, being especially concerned with operations where personnel is involved, i.e., paratrooper jumps. To this end, it is intended to provide the necessary apparatus whereby airdrops can safely and reliably be made from the lowest possible altitude to minimize exposure of both the aircraft and the paratroopers to enemy fire. At the same time this apparatus allows minimum spacing between the individual paratroopers that is compatible with safety and non-interference.

Generally stated, the apparatus herein proposed contemplates more automation in the airdrop operation so as to result in a more precise and controlled sequence or procedure. This is accomplished by interconnecting linkage between the several paratroopers and an ejection or extraction mechanism whereby the group leaves the aircraft as a unit or what might be called a "stick." The interconnecting linkage is releasable automatically operating in a predetermined sequence when the entire group has cleared the aircraft with a special spacing link intact to maintain the individuals a predetermined distance apart during the entire descent.

More specifically, the present invention envisions a plurality of identical harnesses one for each paratrooper with complemental engagements for the interconnection thereof. These engagements are automatically releasable being responsive to a pulling force applied to the harnesses, i.e., a force tending to separate them. This force is produced by an extraction parachute which is attached to the harness of the aftmost trooper (with respect to the flight direction of the aircraft) in the stick and ejected from the aft end of the aircraft. The extraction parachute force is resisted by a tie down connection associated with the harness of the forwardmost trooper in the stick. This has the effect of separating the several paratroopers, i.e., unbuttoning the stick, in successive manner from the forwardmost to the aftmost. A separate spacing link of preselected length interconnects the several successive harnesses to retain the individual troopers the desired, preestablished, maximum distance apart.

As an added feature, a special guide is provided within the aircraft to control and direct the movement of the several paratroopers in the stick during their ejection or extraction from the aircraft. This guide is preferably a knockdown assembly adapted to be installed and removed efficiently and quickly so as not to be a permanent structure within the aircraft. It, therefore, constitutes no obstruction at times when the aircraft is used for other purposes or missions. Thus, this guide may be compactly packaged and stowed at some unobstructive location within the aircraft when not actually being used.

As presently conceived, this guide is formed by a plurality of channeled sheets which are joined end to end in overlapping relation. Each such channel sheet or segment is provided with connections or fittings to secure it to the floor of the aircraft cargo compartment or hold in alignment with an outlet or appropriate opening to the exterior. Thus arranged, the guide has the effect of a chute for ejection of the stick of paratroopers or cargo when launched by operation of he extraction parachute.

With the above and other objects in view as will be apparent, this invention consists in the construction, combination, and arrangement of parts all as hereinafter more fully described, claimed and illustrated in the accompanying drawings wherein:

FIG. 1 is a section taken through the aft end of a typical cargo or transport type aircraft showing a portion of the internal storage compartment or hold with apparatus illustrative of that contemplated by this invention incorporated therein and applied to a number of paratroopers and cargo pieces to be dropped from the aircraft during flight and shows the position of the apparatus and paratroopers/cargo immediately prior to initiation of the airdrop operation by ejection of the extraction parachute;

FIG. 2 is a similar view showing he extraction operation whereby the several paratroopers are withdrawn as a unit or stick from the aircraft while interconnected in close position one to the next;

FIG. 3 is a similar view subsequent to the extraction operation and at the onset of the paratrooper/cargo separation when the individual links interconnecting the several paratroopers/cargo are successively and sequentially released with the spacing links intact so that the individuals are maintained a predetermined distance from one another;

FIG. 5 is a side elevation of a fragment of the guide mechanism by which the path of the several paratroopers/cargo is controlled during the extraction operation showing a pair of adjacent segments which comprises the guide to show the interconnection thereof and the means by which the assembly of segments is secured to the aircraft;

FIG. 6 is a transverse section taken along line 6—6 of FIG. 5;

FIG. 7 is a top plan view of the assembled segments shown in FIG. 5;

Figure 9:
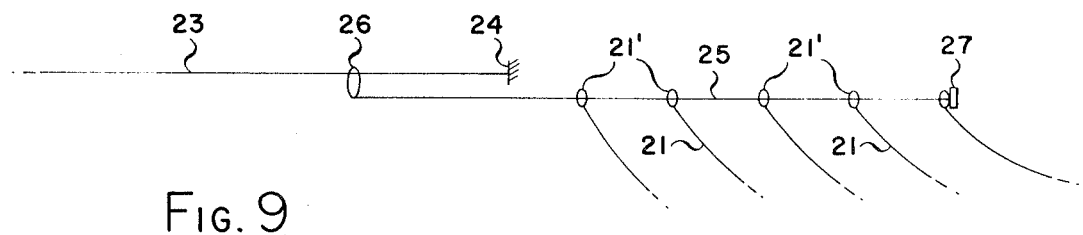
Figure 4:
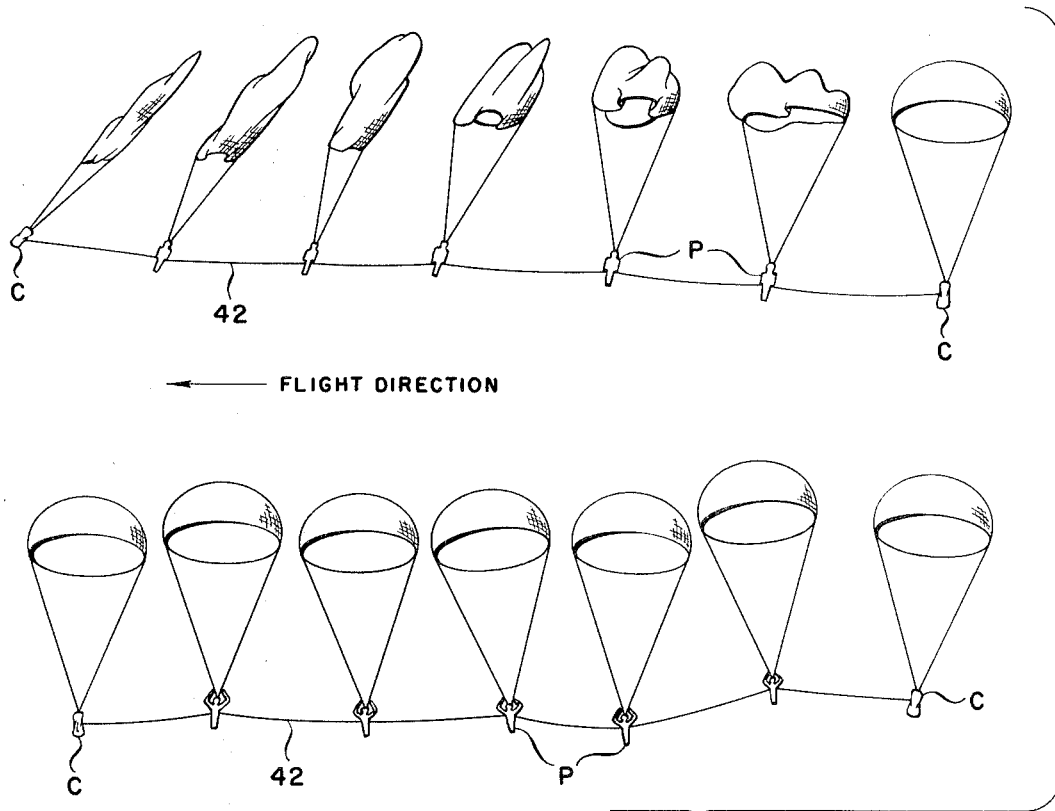
FIG. 4 shows a two-step sequence whereby the several individual parachutes are opened one after the next and ultimately the paratroopers are disposed in a substantial in-line position after all of the individual parachutes have been fully deployed.

FIG. 8 is a perspective view of a plurality of the interconnecting links adapted to extend between individual paratroopers/cargo and thereby connect them as a unit to the extraction parachute to show the releasable interconnection thereof adapted to sequentially separate in an automatic fashion, the links forwardmost having been released and disposed in different stages of separation; and FIG. 9 is a schematic view of the anchor cable within the aircraft and the several parachute static lines to the individual parachutes of the paratroopers/cargo to show the interrelationship thereof.

Referring more particularly to the preferred embodiment of the invention illustrated by way of example in the drawings to facilitate an understanding of the invention, 10 designates the aft end portion of a typical cargo or transport aircraft containing an internal cargo compartment or hold 11. At the extreme aft end, the hold 11 is provided with an opening 12 to facilitate on and off loading as well as aerial delivery of cargo and/or personnel. Normally this opening 12 is closed during flight by a door (not shown) which may be opened in any conventional manner for aerial delivery operations. Typically at the aft end when the door 12 is in the open position, a floor or deck extension 13 which may be the door itself or a portion thereof extends aftwardly from the bottom of the compartment 11 terminating as far aft as possible to facilitate clearance for on and off loading or aerial delivery operations.

The apparatus contemplated by the present invention includes a guide 14 which is adapted to be installed at and along the floor of the compartment 11 to establish and define a controlled path for the objects to pass in the ejection operation. This guide 14 is illustrated generally in FIGS. 1 and 2 and more specifically in FIGS. 5 through 7 and comprises a plurality of identical sections or segments 15 each having a generally U-shaped transverse configuration and terminating at opposite ends in interengaging portions 16 and 17 facilitating an end-to-end overlapping of adjacent segments to form, in effect, one continuous and substantially smooth and uninterrupted internal surface 18 defining the entire guide 14.

One or more projecting pins or buttons 19 may be incorporated in each segment 15. Each such button 19 is adapted to extend from the outer surface of its segment 15 and coact with corresponding retention means or receptacles (not shown) in the floor of the compartment 11. When installed, this guide 14 comprises a slide channel of predetermined length and of a transverse dimension to accommodate the particular objects to be dropped or ejected without undue or excessive lateral movement thereof in the process.

With one or more guides or slide channels 14 installed in the foregoing manner side by side within the aircraft compartment 11, a selected number of paratroopers P, for example, assumes a sitting position within each slide channel 14 facing in a forward direction relative to the flight direction of the aircraft 10, preferably as close as possible one to the next so as to form a tight line or stick.

In order to afford each trooper P maximum safety while at the same time eliminating a need for a reserve parachute, a bundle or cargo pack C may be located at each end of the stick. This gives the added protection of a parachute on each side of each trooper P to share in his support and descent in the event his individual parachute should fail to open. Each such pack C contains supplies or equipment such as ammunition or the like useful to the troopers P when they reach the surface or their destination. Any number of such packs C in combination with the selected number of troopers P may comprise a stick.

Each of the troopers P as well as each pack C is equipped with a parachute 20 and conventional static line 21, the end of which normally attaches to an anchor cable 23 extending along the ceiling of the hold 11 and terminating in a stop 24. In the present case, however, (FIG. 9) the ring 21' at the end of each static line 21 is attached to a static line extension 25 which is interposed therebetween. This extension 25 terminates at one end in a ring 26 adapted to attach to and slide along the anchor cable 23 and at the other end in a stop 27.

In addition each trooper P and each pack C is strapped with a harness 28 which comprises an encircling belt 29 with a conventional buckle, illustrated generally at 30, for its release. A generally conical coupling bolt 31 projects laterally from each side of each belt 29. Also extending from each side of each belt 29 is a coupling strap 32 terminating in an attachment fitting 33 with a hole 34 therein having a diameter substantially equal to the greatest diameter of the coupling bolt 31.

A release link, preferably one that is flexible such as a cable or wire 35, is secured to each fitting 33 and terminates at its other end in a safety release pin 36. Thus, with the several troopers P and packs C assuming the in-line position within the slide channel 14 as described above, each pair of coupling bolts 31 is connected to the harness 28 of the next forward trooper P or pack C as the case may be through the corresponding fitting 33 so as to form the stick. It is to be noted that in this assembly or connection the safety release pins 36 of each fitting 33 pass through complementary holes in the bolts 31 of the second aftward belt 29 and not the next adjacent one.

The release wires or lines 35 with the pins 36 which retain the forwardmost belt 29 connected to the coupling bolts 31 of the next belt 29 constitute an integral extension of or are otherwise connected in suitable fashion to a harness release line 37. Line 37 in turn has an appropriate terminal fitting, indicated at 38 in FIG. 2, to anchor it to a convenient part of the aircraft 10 which if desired could be on the slide channel 14.

The coupling straps 32 of the last or aftmost harness belt 29 are brought together into close proximity where they are connected to an angle fitting 39 (FIG. 8) provided with corresponding coupling bolts 31 for coacting with corresponding fittings 33 on the straps 32. A parachute ring fitting 40 is formed or otherwise provided on the angle fitting 39 at the apex thereof, being adapted to connect to the end of an extraction parachute 41 (FIG. 2).

Prior to the airdrop operation, this extraction parachute 41 is preferably mounted in suitable manner on the ceiling or overhead in the cargo compartment 11 as illustrated in FIG. 1. Upon initiation of the airdrop operation, the parachute 41 is released by suitable means so that it falls out through the aft opening 12 and into the airstream aft of the aircraft 10 where it deploys. An extraction force is thereby applied to the several troopers P and/or packs C withdrawing them from the compartment 11 and into the airstream as a unit or stick.

When the several troopers P/packs C are thus free of the aircraft 10, the harness release static line 37 becomes taut so as to withdraw the safety release pins 36 securing the harness 28 on the first or forwardmost pack C whereby it becomes separated from the rest of the unit or stick a predetermined distance as established by a drift prevention/safety line 42. This drift prevention/safety line 42 is anchored as for example by a ring fitting like 40 to the harness belt 29 at the aft center thereof and at its other end to the front center of the next harness belt 29 in similar manner or the equivalent. A storage pouch 43 may be mounted on each harness belt 29 in a convenient place to receive and contain the associated line 42 when the adjacent harnesses 28 are interconnected by the associated coupling straps 32 as described.

As the first or forwardmost pack C thus moves away from the first trooper P a distance, the release links 35 carrying the pins 36 which connect the belt 29 of the second trooper P or pack C become taut and are ultimately withdrawn thereby separating that trooper P or pack C from the remainder of the group or stick. This sequence is repeated until all of the troopers P and/or packs C are relatively independent of each other, being interconnected to prevent their over-dispersion onto the target area by their respective drift prevention/safety lines 42.

The relative lengths of the static lines 37, the several straps 32 and their links 35, the safety lines 42, the static line extension 25 and the several parachute static lines 21 are such as to establish the desired sequence of operation. In this sequence the parachute 20 of the aftmost pack C is the first to deploy as its ring 21' contacts stop 27 first with the other parachutes 20 opening in succession from the aftmost to the forwardmost. On the other hand, the forwardmost harness 28 is the first released with the others following in succession to the aftmost. The several troopers P/cargo C comprising the entire stick are thus separated or unbuttoned before the first drift prevention line 42 becomes taut and also before the first parachute 20 becomes fully deployed.

What is claimed is:

1. An aerial delivery apparatus for multiple objects from aircraft comprising:
   a plurality of harnesses each adapted to encircle an individual object and terminating in complemental engagements for the interconnection of adjacent harnesses one to the other, said engagements each being automatically releasable upon the application of force tending to separate said harnesses;
   a coupling link of predetermined length connecting adjacent harnesses one to the next;
   a fitting releasably connected to the aftmost harness relative to the direction of flight of said aircraft for connection of an extraction parachute thereto whereby deployment of said extraction parachute withdraws the several harnesses and their respective objects from the aircraft; and
   a releasable connection between the forwardmost harnesses relative to the direction of forward flight of the aircraft and the aircraft, said connection working in opposite to the force application to said plurality of harnesses by said extraction parachute, said releasable connection operating in opposition to the aftward force of said extraction parachute until such extraction parachute force releases said connection whereupon said plurality of harness engagements are subsequently released sequentially from the forwardmost to rearwardmost relative to the direction of flight after release from the aircraft.

2. The apparatus of claim 1 wherein each said harness includes:
   a belt with a generally conical coupling bolt projecting laterally thereof;
   a coupling strap extending rearwardly from said belt relative to the flight direction of the aircraft;
   a perforation in said strap adjacent its free end having dimensions corresponding to those of said bolt whereby the perforation of one harness strap is adapted to encircle the bolt of the next adjacent harness belt; and
   a retaining pin extending from the end of said coupling strap a predetermined distance and adapted to engage the bolt of the harness belt immediately aft of said next adjacent harness belt.

3. The apparatus of claim 2 including one said bolt and one said strap symmetrically arranged on each side of each said belt and wherein the aftmost harness fitting aforesaid is formed by an angle with its apex aft relative to the flight direction of the aircraft and includes one of said coupling bolts projecting laterally adjacent the end of each leg thereof for cooperation with the perforations in the next adjacent harness strap.

4. The apparatus of claim 2 wherein the predetermined distance between said retaining pin and said coupling strap as aforesaid is less than the predetermined length of said coupling link.

5. The apparatus of claim 1 including a channeled guide adapted to be removably mounted to the floor of the aircraft in alignment with an outlet therein and to receive said multiple objects when interconnected through the harness engagements as aforesaid whereby withdrawal thereof from the aircraft is facilitated.

6. The apparatus of claim 5 wherein said guide includes a plurality of segments with releasable, interengaging end portions and at least one tie-down fitting to secure it to said aircraft floor.

7. The apparatus of claim 1 including:
   an individual parachute carried by each said object;
   an anchor cable of fixed, predetermined length longitudinally of the aircraft;
   a static line secured at one end to each said individual parachute and slidably connected at its other end to said anchor cable; and
   a slidable connection between each individual parachute and the slidable end of said static line, each said slidable connection having a predetermined, effective sliding distance different from the others.

8. The apparatus of claim 7 wherein said predetermined effective sliding distance of said slidable connection associated with the aftmost harness is the least and said slidable connections associated with each next adjacent harness is progressively greater.

9. The apparatus of claim 8 wherein said static line includes an extension line having a ring on one of its ends encircling and freely slidable on said anchor line and a stop on its other, free end, and each said slidable connection includes a second static line secured at one end to the associated parachute and a ring on its other end encircling and freely slidable on said extension line between said extension line ring and said stop.

10. The apparatus of claim 7 wherein the predetermined length of said coupling link, the release resisting strength of said releasable connection, the predetermined length of said anchor cable, and the predetermined, effective sliding distance of each said slidable connection are all such as to effect the total withdrawal of the several harnesses and their respective objects from the aircraft by deployment of said extraction parachute, then the release of said harness engagements, and finally deployment of said individual parachutes in sequence and progressively from the aftmost to the forwardmost.

References Cited

UNITED STATES PATENTS

| | | | |
|---|---|---|---|
| 2,345,615 | 4/1944 | Manson et al. | 244—137 |
| 2,479,746 | 8/1949 | l'Anson | 244—137 |

FOREIGN PATENTS 1,084,497  9/1967  Great Britain.

MILTON BUCHLER, Primary Examiner

J. E. PITTENGER, Assistant Examiner